J. R. QUAIN.
APPARATUS FOR THE PRODUCTION OF OZONE.
APPLICATION FILED FEB. 12, 1907.

898,506.

Patented Sept. 15, 1908.

Witnesses:
C. W. Fowler
W. W. Darg

Inventor:
John Robert Quain
By T. Walter Fowler
his atty.

UNITED STATES PATENT OFFICE.

JOHN ROBERT QUAIN, OF LONDON, ENGLAND, ASSIGNOR OF ONE-HALF TO EDWARD APPLE-GARTH, OF LONDON, ENGLAND.

APPARATUS FOR THE PRODUCTION OF OZONE.

No. 898,506.        Specification of Letters Patent.       Patented Sept. 15, 1908.

Application filed February 12, 1907. Serial No. 357,069.

*To all whom it may concern:*

Be it known that I, JOHN ROBERT QUAIN, of 46 Queen Victoria street, in the city and county of London, England, electrical engineer, have invented a certain new and useful Apparatus for the Production of Ozone, of which the following is a full, clear, and exact description, and for which application for Letters Patent has been made in Great Britain, No. 3,905 of 1906, dated February 16, 1906.

This invention relates to an improved electrical apparatus for the production of ozone.

It is well known that in the production of ozone by existing apparatus, one pole of the ozonizer may be sealed in vacuum or otherwise, and operated in conjunction with an exposed metallic pole or electrode. In that form of ozonizer apparatus the exposed electrodes rapidly deteriorate through oxidation, and objectionable gases such as nitrous oxid are thereby produced.

According to the present invention both the poles or electrodes are hermetically sealed by inclosing them *in vacuo* or otherwise within suitable insulating envelops whereby the air or other material containing oxygen to be ozonized does not come into contact with the electrodes.

The invention is hereafter described with reference to the accompanying drawings, in which:—

Figure 1:
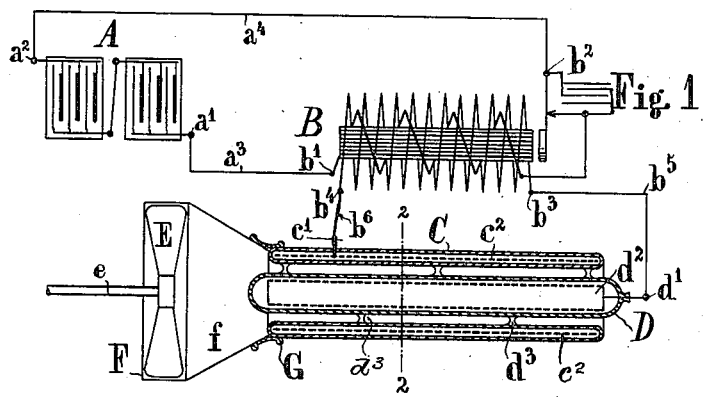
Figure 2:
Figure 3:
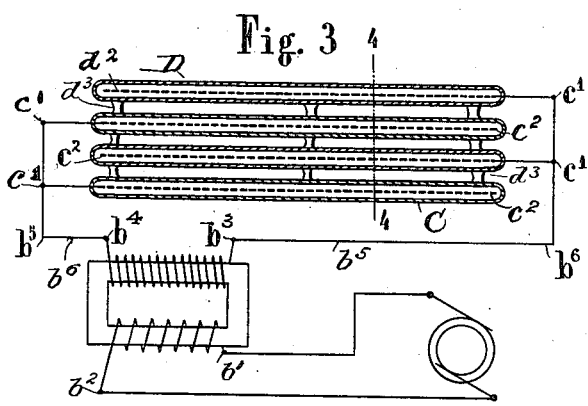
Figure 4:
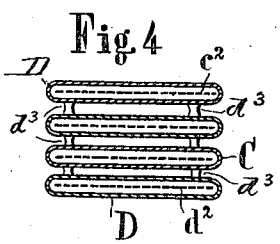
Figure 6:
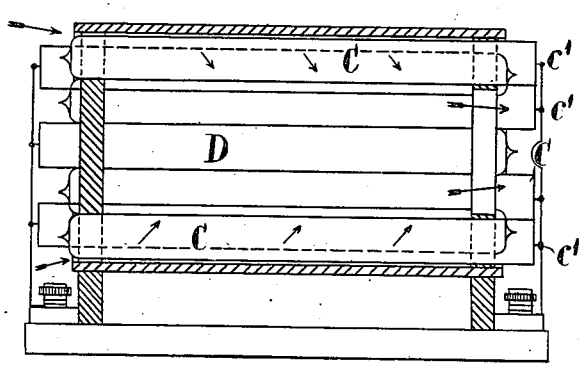
Figure 5:
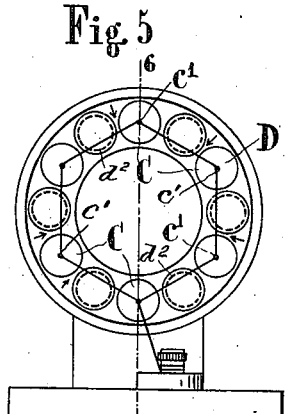

Figure 1 is an elevation of the improved apparatus complete, the sealed tubes being shown in longitudinal section. Fig. 2 is a cross section on line 2—2 of Fig. 1. Fig. 3 is a longitudinal section of a second form of tubular envelops for the electrodes, and Fig. 4 is a transverse section on line 4—4 of Fig. 3. Fig. 5 is an end view of a third form of tubular envelop. Fig. 6 is a longitudinal section of Fig. 5 on the line 6—6.

A source of electric supply such as an accumulator or a magneto generator is employed to supply current of the required tension to the electrodes of the apparatus.

In the drawings an accumulator A provided with terminals $a^1$ $a^2$ is connected by means of conductors or leads $a^3$ $a^4$ to an induction coil or transformer B having primary terminals $b^1$ $b^2$. The coil B is provided with high tension terminals $b^3$ $b^4$ to which are connected the high tension leads $b^5$ $b^6$. The lead $b^5$ is connected electrically at the joint $d^1$ to an electrode $d^2$ which is hermetically inclosed in an envelop D of suitable insulating material. The lead $b^6$ is similarly connected by means of a joint $c^1$ to an electrode $c^2$ which is likewise hermetically inclosed within an insulating envelop C.

In Figs. 1 and 2 the envelop C is shown as an annular tube which may for instance be made of glass and the envelop D is shown as a cylindrical tube which also may be of glass arranged concentrically within the annulus C and separated therefrom by means of studs, projections or the like distance-pieces $d^3$ arranged at intervals along the length of the device. In this way space is left between the tubes C D through which air or other matter to be ozonized is passed by any suitable apparatus. In the drawings is shown a blower consisting of a fan E mounted on a spindle $e$ and journaled in a casing F having a cone-shaped mouth $f$ leading to the tube C. This blower serves to direct a current of air through the space between the tubes C D and this air is accordingly ozonized and driven out at the opposite end of the annular passage (as shown by the arrows in Fig. 6) when the high tension current passes from the one electrode $c^2$ to the second one $d^2$. A rubber or other socket piece G may be employed to connect the mouth $f$ to the tube C as shown in Fig. 1.

The tubes C and D have been described as being hermetically sealed so as to preserve the electrodes therein from contact with the air; they may if desired both be exhausted in any usual manner so that a vacuum of suitable tension is afforded therein and the degree of vacuum may be the same in both tubes or otherwise as preferred.

In the form illustrated in Figs. 3 and 4 the envelops C D are of flat tubular section and superposed in any desired number. These envelops C C and D D are separate and are maintained apart by distance pieces $d^3$. The electrodes $c^2$ $d^2$ which are hermetically sealed in the flat tubes C C D D are connected as before to the leads $b^6$ $b^5$ and where a number of electrodes $c^2$ or $d^2$ are employed they are connected together in parallel.

In a third form of the invention shown in Fig. 5, the electrodes C D assume the form of tubes of equal diameter and are arranged in a circle about the central air passage which in this arrangement is of cylindrical bore.

In lieu of the accumulator shown in Fig. 1 any other source of current may be employed and it is convenient where a magneto generator is employed for that purpose to actuate the blower E through suitable driving connections from the magneto generator. Or if another source of electric supply is available such as a house lighting circuit the terminals $a^1$ $a^2$ may be connected thereto and again the blower E may be actuated by the electric supply.

The distance pieces $d^3$ may be made of glass, vulcanite or other insulating material. The electrodes are constructed of any suitable material and are conveniently made of copper gauze. The tubes or envelops may with advantage be exhausted to a vacuum obtainable by a mercury pump.

In Figs. 5 and 6 the air from the blower passes between adjacent tubes C D into the central cylindrical passage as represented by the arrows.

Having thus described my invention what I claim as such and desire to secure by Letters Patent, is:—

1. An apparatus for the production of ozone, comprising a source of high tension current, electrodes sealed in insulating envelops, said envelops being exhausted so that said electrodes are *in vacuo*, current conveying connections to said electrodes, said envelops being arranged in parallel planes and being spaced apart by insulated distance-pieces to form relatively narrow passages whose length is substantially parallel with the axes of the envelops, and means for passing air through the space between said electrodes.

2. An apparatus for the production of ozone, comprising a source of current, a transformer, electrodes in insulating and vacuum-containing envelops, connections from said transformer to said electrodes, said envelops being arranged adjacent to one another with a space between and means for directing through said space in a direction parallel with the length of the electrodes and envelops the air to be ozonized.

3. An apparatus for the production of ozone, comprising a source of current, a transformer, electrodes in insulating and vacuum-containing envelops, connections from said transformer to said electrodes, said envelops being arranged in parallel planes adjacent to one another with insulated distance pieces between to form a conducting space which extends lengthwise of the electrodes and inclosing envelops, and means for directing air past said distance pieces and along the envelops.

4. An apparatus for the production of ozone, comprising a source of current, a transformer, positive and negative electrodes both sealed in separate exhausted envelops, said envelops being of insulating material and adjacent to one another, and means for passing air between said envelops in the direction of the length thereof and of the electrodes.

5. An apparatus for the production of ozone, comprising a source of current, a transformer, positive and negative electrodes which are both sealed in separated exhausted envelops, said envelops being of insulating material and being arranged in parallel planes adjacent to one another to form a space whose greatest length is in the direction of the length of the electrodes, and a blower for passing air between said envelops.

6. In apparatus for the production of ozone, the combination of a source of electric current, a positive electrode sealed in an exhausted envelop, a negative electrode also sealed in a second exhausted envelop, said envelops being of insulating material and being arranged in parallel planes and being separated by distance-pieces of insulating material so as to leave a lengthwise extending passage between said envelops.

7. In apparatus for the production of ozone, the combination of a source of electric current, a positive electrode sealed in an exhausted tube, a negative electrode also sealed in a second exhausted tube, and external electrical connections with said electrodes, said tubes being spaced apart from one another and means for passing air along said tube in the direction of the length thereof.

8. In apparatus for the production of ozone, the combination of a generator, a positive electrode in a vacuum tube, a negative electrode in a second vacuum tube said electrodes being in electric connection with said generator and said tubes being maintained parallel but apart by distance pieces, and means for driving a current of air along said tubes in the direction of the length thereof.

9. In apparatus for the production of ozone, the combination of a generator, a plurality of positive electrodes each in a vacuum tube, a plurality of negative electrodes each in a vacuum tube, means for maintaining said tubes parallel and spaced apart, and means for passing air along the exterior of said tubes in the direction of the length thereof.

10. In apparatus for the production of ozone, the combination of a generator, positive electrodes each in a vacuum tube, negative electrodes each in a vacuum tube, means for maintaining said tubes parallel and spaced apart, and a blower for forcing a current of air along the outside of said tubes in the direction of the length thereof.

11. In apparatus for the production of ozone, the combination of a generator, a positive electrode sealed in a vacuum tube, a negative electrode in a second vacuum tube, said electrode being connected electrically to said generator and said tubes being maintained parallel but apart by distance pieces, a blower for driving a current of air along said tubes in the direction of the length thereof, and a coned discharge outlet from the casing of said blower.

12. In apparatus for the production of ozone, the combination of a generator, an electrode sealed in a vacuum tube, a second electrode sealed in a second vacuum tube, said electrode being connected electrically to said generator, said tubes being maintained parallel and apart by distance pieces, so that an annular space exists between said tubes, and a blower for driving air along said space between the tube in the direction of the length thereof.

13. In apparatus for the production of ozone, the combination of a generator, a plurality of positive electrodes each sealed in a vacuum tube, a plurality of negative electrodes also sealed in separate vacuum tubes, said electrodes of each polarity being connected together and said electrodes being also connected to the generator, the positive and negative tubes being arranged in parallel planes and spaced sidewise apart, said tubes being, also, arranged alternately in annular fashion about a cylindrical passage, said passage communicating with the outlet from a blower so that air may be forced lengthwise along this passage formed by said tubes.

In witness whereof I affix my signature in presence of two witnesses.

JOHN ROBERT QUAIN.

Witnesses:
VICTOR F. FEENY,
CYRIL J. FEENY.